United States Patent [19]
Brown

[11] Patent Number: 5,914,714
[45] Date of Patent: Jun. 22, 1999

[54] SYSTEM AND METHOD FOR CHANGING THE CHARACTERISTICS OF A BUTTON BY DIRECT MANIPULATION

[75] Inventor: Christopher R. Brown, Seattle, Wash.

[73] Assignee: Microsoft Corporation, Redmond, Wash.

[21] Appl. No.: 08/831,045

[22] Filed: Apr. 1, 1997

[51] Int. Cl.$^6$ ................................. G06F 7/00; G06F 3/14
[52] U.S. Cl. .......................... 345/339; 345/357; 345/348; 345/145
[58] Field of Search ..................................... 345/331, 335, 345/346, 356, 357, 339, 348, 145; 395/683

[56] References Cited

U.S. PATENT DOCUMENTS

| | | | |
|---|---|---|---|
| 5,530,796 | 6/1996 | Wang | 345/335 |
| 5,625,781 | 4/1997 | Cline et al. | 345/335 |
| 5,801,702 | 9/1998 | Dolan et al. | 345/357 |

OTHER PUBLICATIONS

*Microsoft Word: The World's Most Popular Word Processor, Version 6.0 User's Guide*, Microsoft Corporation, 1993–1994, pp. xi, 737–758.

Primary Examiner—Raymond J. Bayerl
Assistant Examiner—Cao H. Nguyen
Attorney, Agent, or Firm—Jones & Askew, LLP

[57] ABSTRACT

In a computer employing a graphical user interface (GUI), a web browser displays a drop down menu bar, an address bar, and a links bar. Each button on the links bar has a customizable title and an associated URL. When the user clicks on a button, the browser is pointed directly to the URL associated with the button. The user may alter the title and URL associated with each button by dragging a GUI link element (e.g., a graphic or text representing a hypertext link) onto the links bar button. The browser determines the characteristics associated with the dropped GUI element and replaces the button's characteristics with those of the dropped object. This allows the characteristics of the button to be altered by direct on-screen manipulation of the affected GUI object, instead of requiring use of a separate dialog box or other interface.

8 Claims, 7 Drawing Sheets

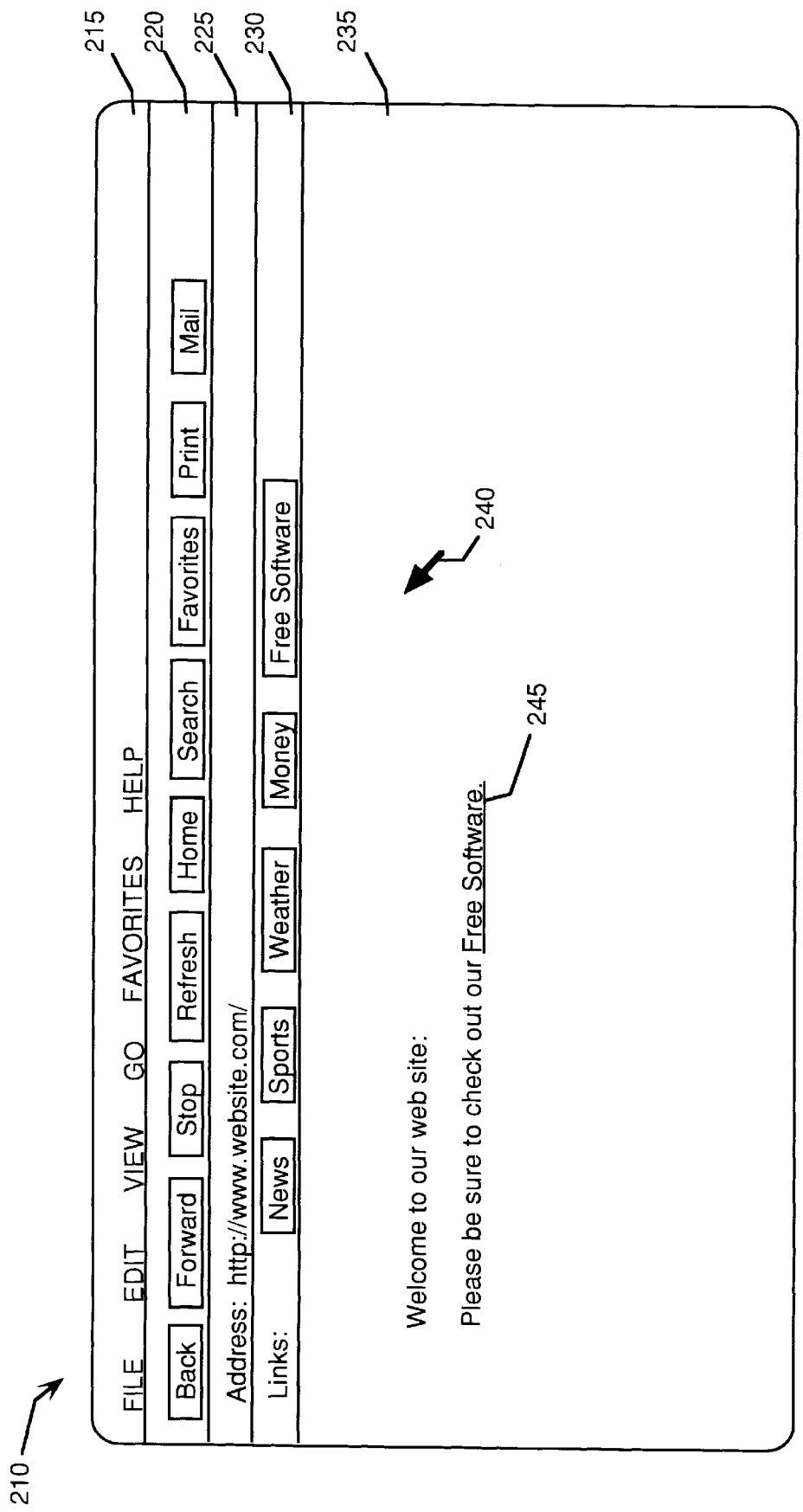

SYSTEM AND METHOD FOR CHANGING THE CHARACTERISTICS OF A BUTTON BY DIRECT MANIPULATION

TECHNICAL FIELD

The present invention relates to the manipulation of objects in a graphical operating system, and more particularly relates to an improved system and method changing the characteristics of a button by direct manipulation of the affected object.

BACKGROUND OF THE INVENTION

Most modern computer software employs a graphical user interface to convey information to and receive commands from users. The graphical user interface relies on a variety of graphical user interface (GUI) elements or objects, including icons, text, drop-down menus, dialog boxes, toolbars, buttons, and the like. A user typically interacts with a graphical user interface by using a pointing device (e.g., a mouse) to position a pointer or cursor over an object and "clicking" on the object. An example of an operating system that provides a graphical user interface is the "WINDOWS 95" operating system, which is manufactured and sold by Microsoft Corporation of Redmond, Wash.

In a system that employs a graphical user interface, icons are used to represent files, folders, and other objects that can be manipulated by the user. In most cases, a user may select a GUI object by clicking on the object, and may open or launch an object by double-clicking on the object. A GUI object may be moved by positioning the pointer over the object, pressing and holding down the mouse button, and moving the pointer. Once the object has been moved to the desired location, the mouse button is released. This direct manipulation technique is known as "dragging and dropping" an object, and may be used to reposition an object, or to invoke a function by dropping the "dragged" object onto the "target" object.

Drop down menus are used to organize numerous computer commands into major headings, which are displayed in a menu bar that appears along the top of a window. Each heading represents a menu that drops down when the user clicks on the heading in the menu bar. This allows access to the commands that are listed in the drop down menu. A user selects a particular command by dragging the pointer down to the command and releasing the mouse button. Drop down menus provide a space-efficient means for organizing and displaying numerous commands.

Toolbars are common GUI elements that provide another effective way to display numerous computer commands. Toolbars provide access to a set of commands that are usually represented by buttons. A user can invoke any command in the toolbar by clicking once on the associated button. Toolbars typically present groups of command buttons in rows or columns. Some toolbars can be turned on or off, and can be oriented horizontally or vertically. Although most toolbars are visually attached to a window, some may float above a window. The primary advantage of toolbars is that they present a set of buttons or commands that are only one click away while the user is using the associated program.

An useful application of a toolbar-type GUI element appears in Microsoft Corporation's "INTERNET EXPLORER" web browser program. In addition to a menu bar, the program provides a toolbar, an address bar, and a links bar. The toolbar provides buttons representing standard commands. The address bar displays the uniform resource locator (URL) of the page that is being viewed, and allows a user to enter the URL of a page that he or she wants to view. The links bar provides a group of buttons that, when clicked, point the browser directly to the URL that is associated with that button. The links bar allows a user to go to these URLs with a single click, instead of having to use a drop down menu (e.g., a "Favorites" menu) or similar control.

In most programs that employ toolbars, the toolbars can be modified by adding or deleting buttons, or by changing the function associated with a button. This allows the user to customize a toolbar so that the toolbar provides convenient access to the commands that are most frequently used by the user. In prior art systems, the process of customizing a toolbar requires the user to select a customize command from one of the menus in the menu bar. A dialog box then appears and displays a list of commands that are available for the toolbar. To add one of these commands to a toolbar, the user drags an object from the dialog box to the desired position on the toolbar. A new button then appears on the toolbar and is bound to the operation identified in the dialog box. In the case of the links bar in the "INTERNET EXPLORER" program, the title and URL associated with a button may be changed by typing the new URL and title in a dialog.

In other prior art systems, some types of GUI objects may be added to a toolbar by dragging the object directly from a window onto a toolbar. This approach is described in U.S. application Ser. No. 08/379,705, entitled, "Method and System for Adding Buttons to a Toolbar," filed Jan. 27, 1995, now U.S. Pat. No. 5,644,739, which is assigned to the assignee of the present invention and which is incorporated herein by reference.

However, the prior art does not provide convenient methods for altering the characteristics of an existing toolbar button by directly interacting with the object itself. Prior art methods require the user to employ a separate dialog box, which provides options associated with the toolbar.

Therefore, there is a need in the art for a system that allows a user to alter one or more characteristics of a GUI object (e.g., a toolbar button) by directly manipulating the GUI object. This would allow a user to quickly and easily alter a toolbar so that it includes the functions that are most useful to the user.

SUMMARY OF THE INVENTION

The present invention satisfies the above-described needs by providing a system and method for altering the characteristics of a GUI element by directly manipulating the affected GUI element. The invention allows a user to alter the characteristics of a button by dragging and dropping a GUI element that represents the new characteristic onto the toolbar button.

Generally described, the present invention provides a method for altering the characteristics of an object by direct manipulation. The method includes displaying a first object, which has a first characteristic, and a second object, which has a second characteristic. In response to dropping the first object on the second object, the first characteristic is associated with the second object.

In another aspect, the present invention provides a computer-readable medium having computer-executable instructions for performing steps for altering the characteristics of an object by direct manipulation. The instructions include displaying a first object having first characteristics and a second object having second characteristics. In response to dropping the first object on the second object, the first characteristic and the identity of the second object are determined. The second characteristic is replaced with the first characteristic so that the first characteristic is now associated with the second object.

In yet another aspect, the present invention provides a computer system for altering the characteristics of a target object via direct manipulation. The computer system includes a processing unit, an input device connected to the processing unit, a display device connected to the processing unit for displaying the target object, and memory connected to the processing unit and containing a program module. In response to instructions from the program module, the processing unit is operative to display the target object and a source object. First and second addresses are associated with the target object and source object, respectively. In response to an input signal indicating the source object has been dropped on the target object, the processing unit associates the second address with the target object. In response to an input signal indicating the subsequent selection of the target object, the processing unit retrieves data associated with the second address.

The various aspects of the present invention may be more clearly understood and appreciated from a review of the following detailed description of the disclosed embodiments and by reference to the appended drawings and claims.

DETAILED DESCRIPTION

Figure 1:
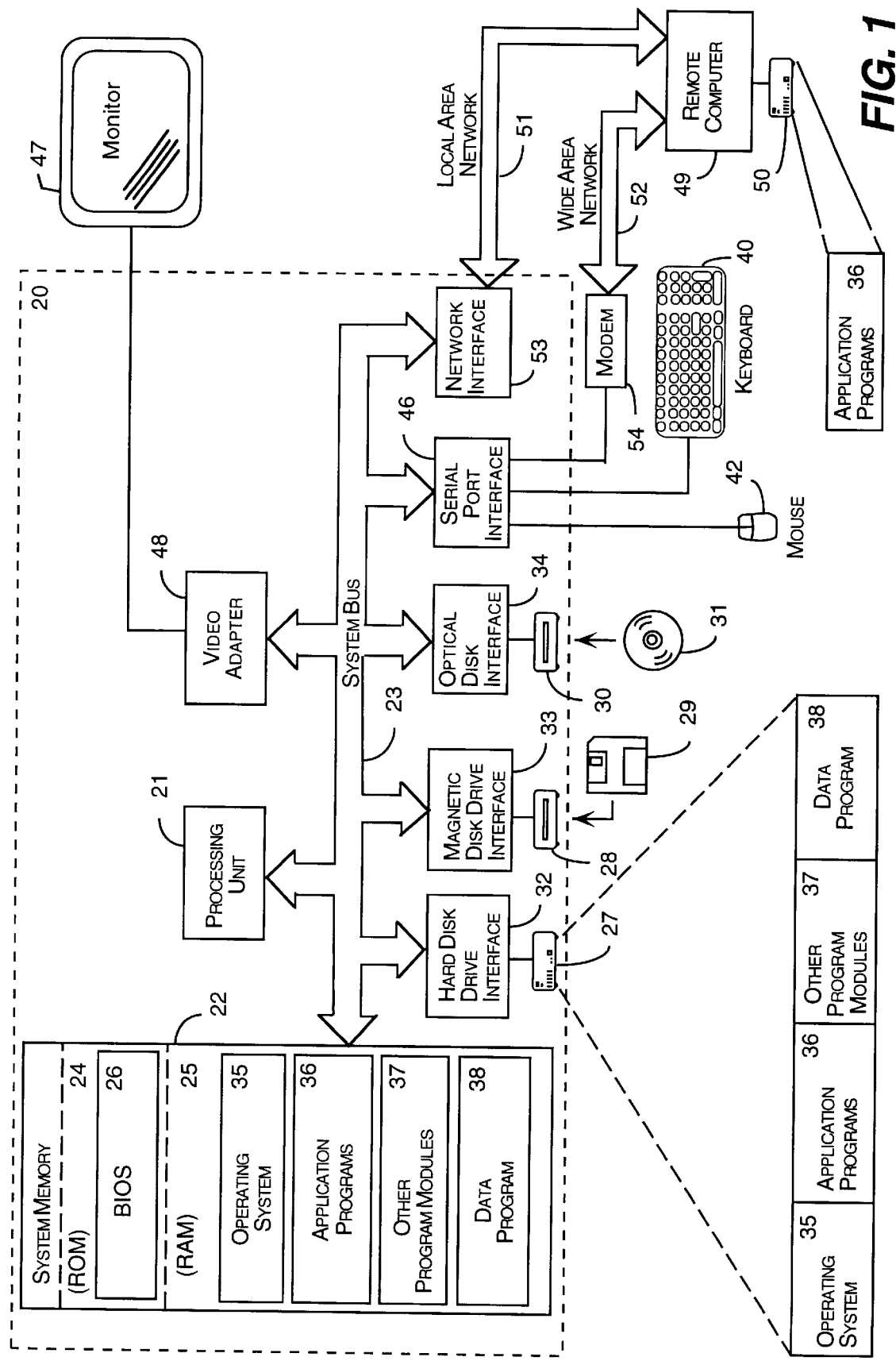
FIG. 1 is a block diagram of a personal computer that provides the operating environment for an embodiment of the present invention.

The present invention is directed to a method and system for altering the characteristics of a GUI object, such as a toolbar button, by direct on-screen manipulation of the GUI object. In one embodiment, the invention is incorporated into the "INTERNET EXPLORER" program module, which is marketed by Microsoft Corporation of Redmond, Wash. Briefly described, the "INTERNET EXPLORER" web browser is a client program that allows a user to navigate and view information available via the World Wide Web.

Referring now to the drawings, in which like numerals represent like elements throughout the several figures, aspects of the present invention and an exemplary operating environment will be described.

EXEMPLARY OPERATING ENVIRONMENT

FIG. 1 and the following discussion are intended to provide a brief, general description of a suitable computing environment in which the invention may be implemented. While the invention will be described in the general context of a web browser program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a web browser program 37, which is an exemplary embodiment of the invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

A METHOD FOR ALTERING THE CHARACTERISTICS OF A GUI ELEMENT

An exemplary method for altering the characteristics of a GUI element by direct manipulation is illustrated in conjunction with FIG. 2, which consists of FIGS. 2a–2e.

FIGS. 2a–2e illustrate a sequence of screen displays that depict the process by which a user can alter the characteristics of a GUI element by direct manipulation. In FIGS. 2a–2e, a window 210 is displayed by a web browser program module, such as the "INTERNET EXPLORER" web browser. In an exemplary embodiment, the window 210 includes a drop down menu bar 215, a toolbar 220, an address bar 225, and a links bar 230. The contents of web pages are viewed in the viewing area 235. The pointer 240 is controlled by the mouse 42 (FIG. 1) and allows the user to select GUI elements.

The menu bar 215 displays the names of several drop down menus. When selected, each of the drop down menus displays a list of available commands (not shown).

The toolbar 220 includes buttons that are associated with various Internet and World Wide Web-related activities. For example, the "BACK" and "FORWARD" commands allow the user to move back and forth between recently view web pages. The "STOP" button allows the user to terminate the downloading of a web page. The "REFRESH" button is used to download the web page that is currently being viewed. The "HOME" button points the browser to the address of the web page that the user prefers to start at. The "SEARCH" button points the browser to the user's preferred searching web page. The "FAVORITES" button exposes a list of web pages that the user has stored. The "PRINT" and "EMAIL" buttons allows the user to print web pages and access the browser's email facility.

The address bar 225 serves two functions. It displays the URL, or address, of the web page that is currently being viewed. In this case, the user is viewing a hypothetical web site with the URL "http://www.website.com." The user may also type the URL of a new web page in order to point the browser to that web page.

Figure 2A:
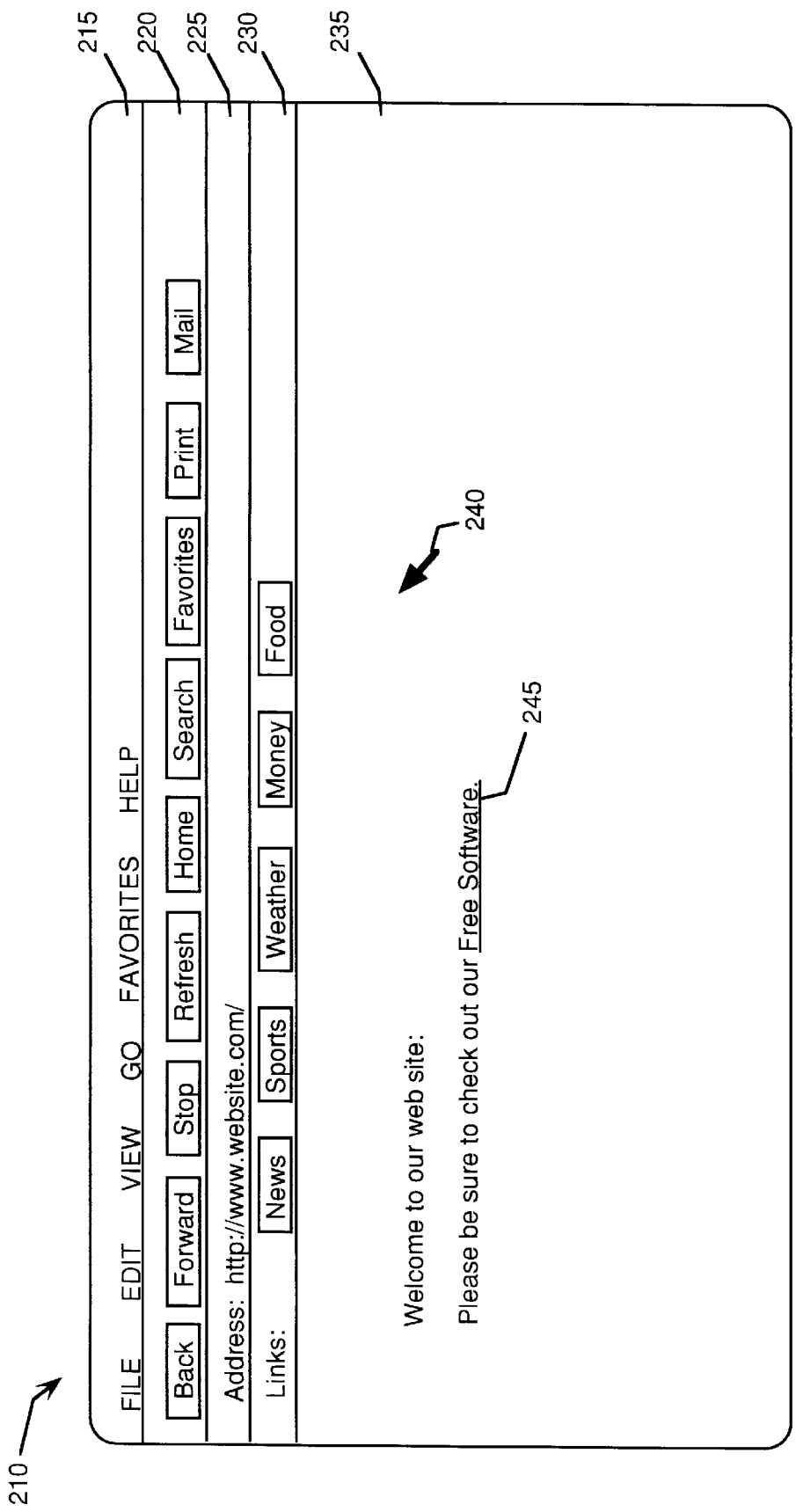
FIG. 2, consisting of FIGS. 2a–2e, illustrates a sequence of screen displays depicting a method for altering the characteristics of a button by direct manipulation in accordance with an exemplary embodiment of the present invention.

The links bar 230 is a toolbar-like GUI element that includes a group of buttons that each point to a web page. The user may point the browser to a web page by simply clicking once on the appropriate links bar button. Those skilled in the art will appreciate that the publisher of the browser program module may preprogram the links bar buttons to web pages associated with the company. In the example of FIG. 2a, the links bar buttons have been programmed to point to hypothetical web sites called "NEWS,"  "SPORTS," "WEATHER," "MONEY," and "FOOD." Each of these buttons is associated with a URL. When the user clicks on a links bar button, the browser is pointed to the associated URL.

In FIG. 2a, the viewing area 235 displays the text of a hypothetical web site. Those skilled in the art will appreciate that the underlined text "Free Software" represents a hypertext link (which is a GUI object) to another web page that pertains to free software. Hypertext links have associated with them the URL of the page to which they refer. When a user clicks on the "Free Software" hypertext link, the browser determines the URL associated with that link and points the browser to the new link.

In the prior art, the user could alter the behavior of the links bar buttons and the "HOME" and "SEARCH" buttons by opening a separate dialog. The dialog allowed the user to select one of the seven buttons and type in a new URL, which would then be associated with that button. In the case of the links bar buttons, the user can also alter the name of the button by entering a new name in the dialog.

The present invention allows a user to alter the characteristics of a GUI elements by direct manipulation of the affected element, instead of employing a dialog. In the context of the "INTERNET EXPLORER" web browser, an embodiment of the invention allows the user to alter the links associated with the links bar buttons and the "HOME" and "SEARCH" buttons, and the titles displayed with the links bar buttons. This is accomplished by dragging and dropping a GUI link element, such as a hypertext link 245 or graphic (not shown), onto one of the buttons. This results in the alteration of the button's characteristics without requiring the user to employ a dialog box. This process is illustrated in FIGS. 2b–2e.

Figure 2B:
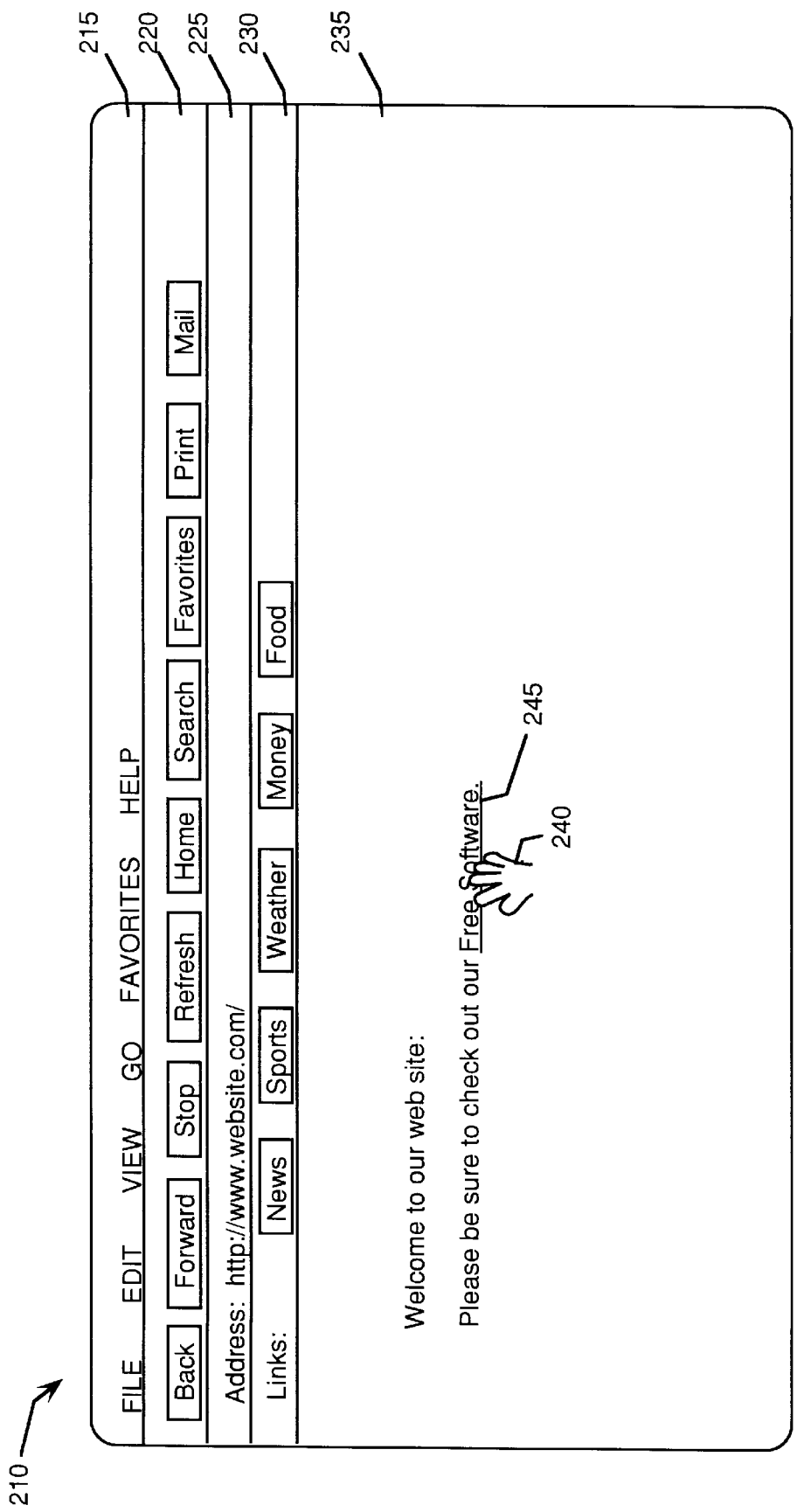

In FIG. 2b, the user has moved the pointer over the hypertext link 245, which is the "source object." This results in the pointer changing from an arrow to a hand, which indicates that the user can drag the GUI object (i.e., the hypertext link 245) or click on it to go to that web page.

Figure 2C:
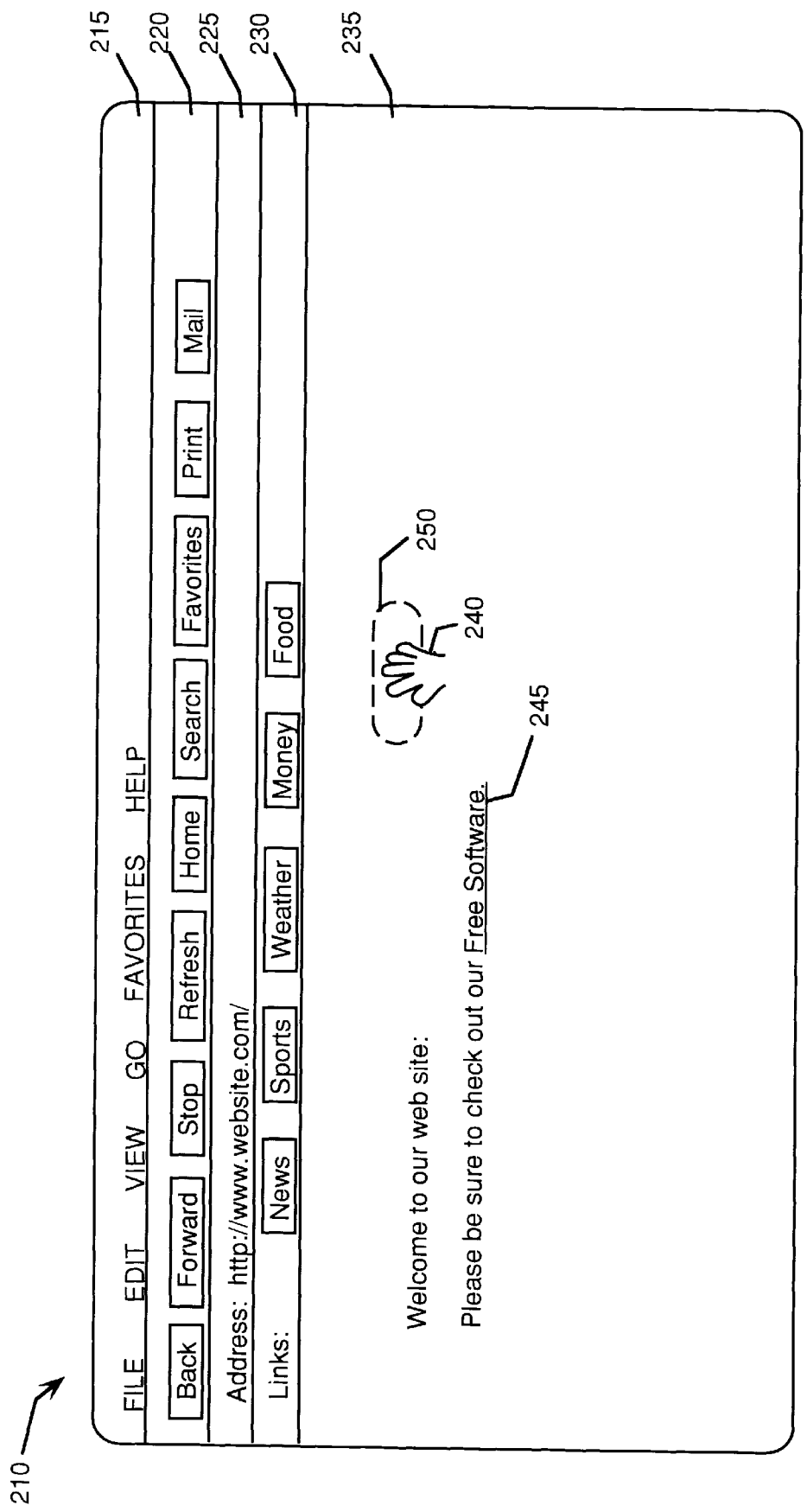

In FIG. 2c, the user has begun to drag the pointer 240 toward the links bar 230 or the tool bar 220. At this point, the dragged source object 250 is illustrated as an outlined box.

Figure 2D:
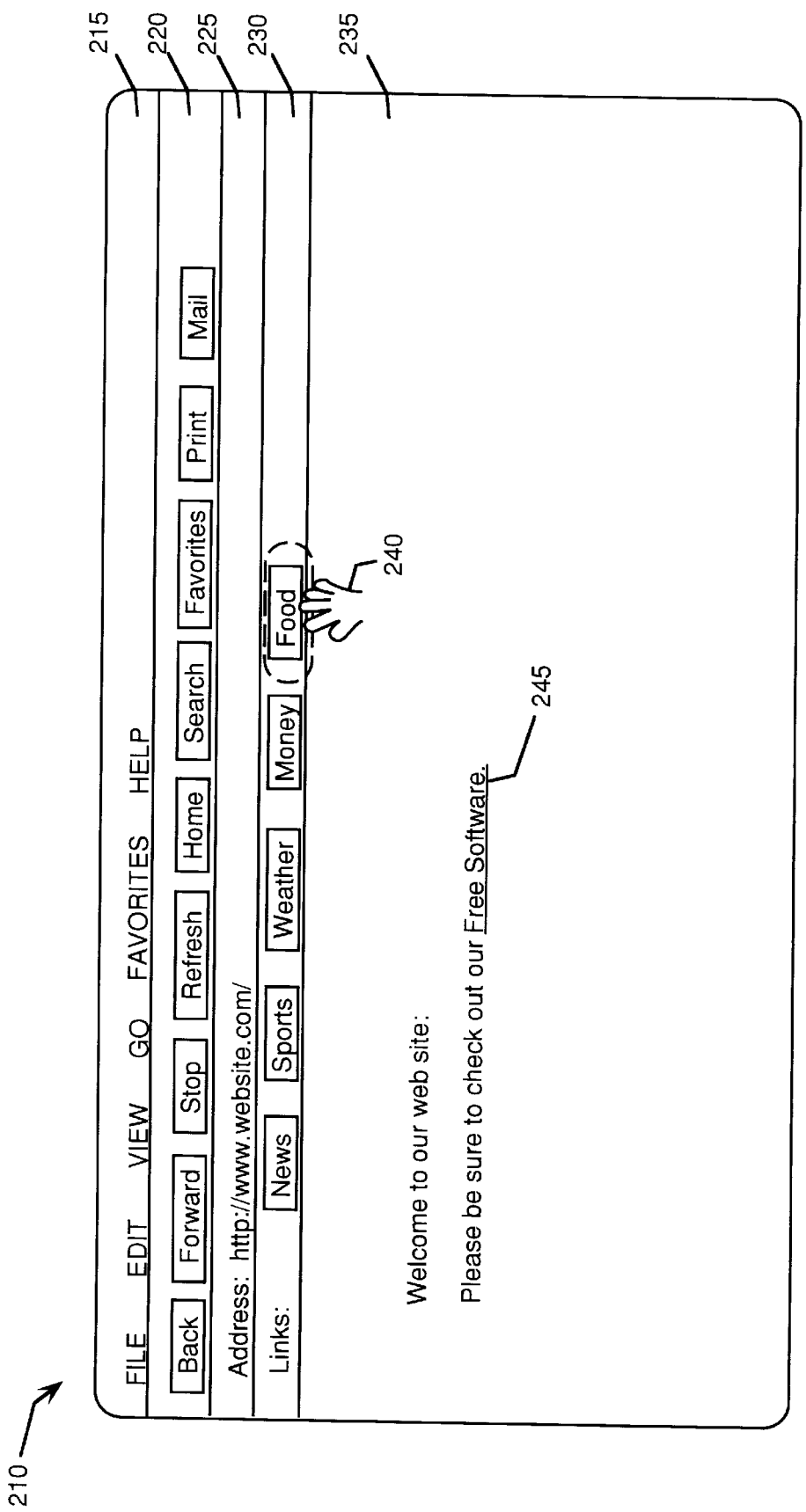

In FIG. 2d, the user has dragged the pointer 240 over one of the links bar buttons. When the user releases the mouse button and drops the dragged object on the button, the program automatically alters the characteristics of the target object. In this case, the title of the button is changed from "FOOD" to "FREE SOFTWARE," as illustrated in FIG. 2e, and the associated link has been changed to the URL associated with the "FREE SOFTWARE" hypertext link 245. When the user clicks on the "FREE SOFTWARE" button, the browser will be pointed to the associated URL.

From the foregoing description, those skilled in the art will appreciate that the described method allows the user to easily alter the characteristics of a button by directly manipulating the affected button. This process is much simpler than prior art methods that employ a dialog box and require the user to type in new button names and associated URLs.

Figure 3:
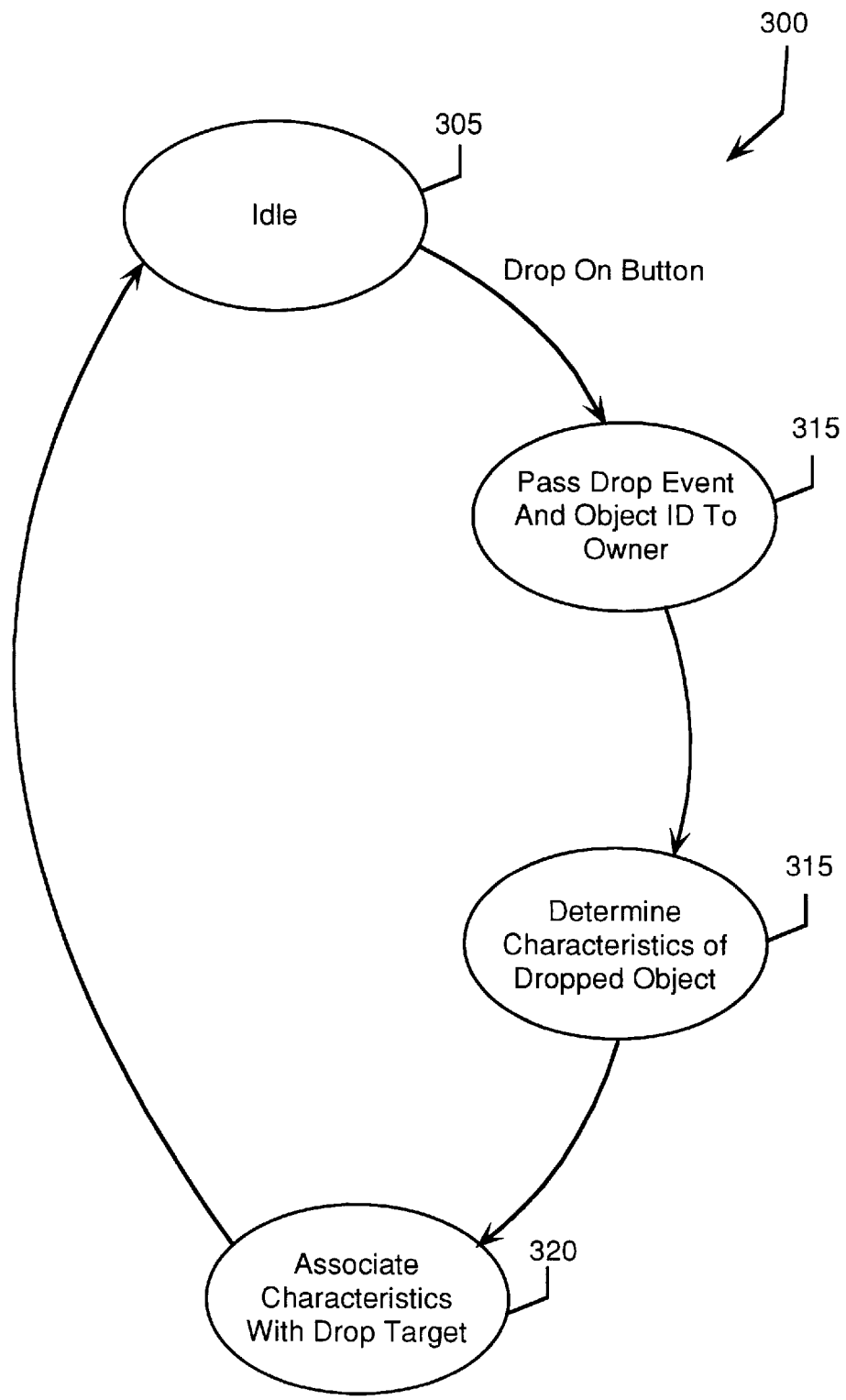
FIG. 3 is a state diagram illustrating an exemplary method for altering the characteristics of a button by direct manipulation, as illustrated in FIG. 2.

FIG. 3 is a state diagram that illustrates an exemplary method 300 for altering the characteristics of a GUI object by direct manipulation of the affected object. Those skilled in the art will appreciate that the process described by the state diagram of FIG. 3 is executed by the processing unit 21 (FIG. 1) in response to instructions that have been incorporated into various program modules, including the operating system, web browser, etc.

Those skilled in the art will also understand that the operating system and browser program modules employ a variety of techniques that facilitate communications between the computer hardware and various program modules. For example, each GUI object has an object identifier that is used to identify the element. These features allow data to be passed back and forth between various processes and facilitates interaction with the user via the mouse and other input devices.

The method 300 begins at the idle state 305. The term "idle" is meant to indicate only that no GUI link elements are being dragged onto buttons. Those skilled in the art will appreciate that the browser may be involved in a variety of other activities associated with displaying web pages, etc., and still be "idle" for purposes of this discussion.

When the toolbar receives a drop event, the method proceeds to state 310. At state 310 toolbar passes the drop event and the object identifier of the drop target (i.e., the button) to the owner of the links bar (i.e., the browser program).

At state 315 the browser determines the identity and characteristics (e.g., title and URL) of the dropped object. At state 320 the browser associates the characteristics of the dropped object with the drop target. In the example of FIG. 2, this results in the button's old title being replaced with the new title "Free Software" and the associated link being replaced with the URL of the free software page. The method then returns to the idle state 305.

This process results in the characteristics of the drop target being altered to correspond with the characteristics of the dragged object. This is accomplished by directly manipulating the GUI elements without requiring the user to use the dialog.

SUMMARY OF THE DETAILED DESCRIPTION

From the foregoing description, it will be appreciated that the present invention provides an improved system and method for altering the characteristics of a GUI object by direct manipulation. In an exemplary system, the characteristics associated with buttons on a toolbar-like GUI object are altered to match the characteristics of a GUI object that has been dragged and dropped onto the button. In particular, the title and URL associated with the button are changed to correspond to the title and URL associated with a GUI link element that has been dropped on the button. This provides a simple, efficient way to alter the characteristics of toolbar buttons.

The invention may conveniently be implemented in one or more program modules that are based upon the state diagram of FIG. 3, and the features illustrated in FIG. 2. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Although the invention was described in the context of a web browser, which displayed a links bar and GUI link objects, those skilled in the art will appreciate that the invention is applicable not only to web browsers and GUI objects that represent hypertext links, but also to other types of GUI objects and program modules. Similarly, the invention may be applied regardless of whether the GUI elements and controls are implemented in program modules associated with an operating system or application program.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-readable medium storing computer-executable instructions for performing the steps of:

displaying a window having a links bar and a viewing area on a graphical display device;

displaying a link object within the links bar, the link object having a first object identifier and a first characteristic associated with a first link element;

displaying the first object identifier in association with the link object;

receiving a user command selecting the link object and, in response, using the first characteristic to retrieve the first link element and displaying at least a portion of the first link element in the viewing area;

displaying a drop object in the viewing area, the drop object having a second object identifier, a second characteristic, and a second link element;

receiving a user command selecting, dragging, and dropping the drop object onto the link object; and in response to the drop and drag command, replacing the first object identifier and the first characteristic of the link object with the second object identifier, and the second characteristic respectively;

receiving a subsequent user command selecting the link object, and, in response, using the second characteristic to retrieve the second link element and displaying at least a portion of the second link element in the viewing area.

2. The computer-readable medium of claim 1, wherein the first link element is a first web page, the first object identifier is a title of the first web page, and the first associated characteristic is a uniform resource locator for the first web page.

3. The method of claim 1, wherein the second link element is a second web page, the second object identifier is a title of the second web page, and the second characteristic is a uniform resource locator for the second web page.

4. The method of claim 1, wherein the drop object comprises content information within the first web page.

5. A computer-readable medium storing computer-executable instructions for performing the steps of:

displaying a window having a links bar and a viewing area on a graphical display device;

displaying a link button within the links bar, the link object having a first title and a first uniform resource locator associated with a first web page;

displaying the first title in association with the link button;

receiving a user command selecting the link button and, in response, using the first uniform resource locator to retrieve the first web page and displaying at least a portion of the first web page in the viewing area;

displaying a drop object in the viewing area, the drop object having a second title and a second uniform resource locator associated with a second web page;

receiving a user command selecting, dragging and dropping the drop object onto the link object; and in response to the drop and drag command, replacing the first title, and the first uniform resource locator with the second title and the second uniform resource locator, respectively;

receiving a subsequent user command selecting the link button, and, in response, using the second uniform resource locator to retrieve the second web page and displaying the second web page in the viewing area.

6. The method of claim 5, wherein the title of the link button corresponds to a title associated with the first web page.

7. The method of claim 6, wherein the title of the link button corresponds to a title associated with the second web page.

8. The method of claim 7, wherein the drop object comprises content information within the first web page.

* * * * *

UNITED STATES PATENT AND TRADEMARK OFFICE
CERTIFICATE OF CORRECTION

PATENT NO. : 5,914,714

DATED : June 22, 1999

INVENTOR(S) : Christopher R. Brown and Christopher J. Guzak

It is certified that error appears in the above-identified patent and that said Letters Patent is hereby corrected as shown below:

On the title page item [75], add "Christopher J. Guzak, Kirkland, Washington" as a named inventor.

Signed and Sealed this

Seventh Day of December, 1999

Attest:

Q. TODD DICKINSON

*Attesting Officer*      *Acting Commissioner of Patents and Trademarks*